(12) United States Patent
Wang

(10) Patent No.: US 7,497,416 B2
(45) Date of Patent: Mar. 3, 2009

(54) SAFETY VALVE DEVICE WITH A MANUAL SEAL ASSEMBLY FOR AN INFLATABLE APPARATUS

(76) Inventor: Cheng-Chung Wang, 12F, No. 440, Sec. 4, Jen-Ai Rd., Taipei (TW)

( * ) Notice: Subject to any disclaimer, the term of this patent is extended or adjusted under 35 U.S.C. 154(b) by 360 days.

(21) Appl. No.: 11/204,255

(22) Filed: Aug. 15, 2005

(65) Prior Publication Data

US 2006/0033067 A1    Feb. 16, 2006

(30) Foreign Application Priority Data

Aug. 16, 2004    (CN)    ............ 2004 2 0082901

(51) Int. Cl.
*F16K 31/00*    (2006.01)
*F16K 15/20*    (2006.01)
(52) U.S. Cl. .............. 251/349; 251/353; 137/232
(58) Field of Classification Search .......... 251/353, 251/272, 255, 322, 223, 252, 349, 321; 137/614.2, 137/230, 223, 224.5, 225, 234, 234.5, 263, 137/862; 215/213, 214, 218, 251, 227
See application file for complete search history.

(56) References Cited

U.S. PATENT DOCUMENTS

| | | | | |
|---|---|---|---|---|
| 2,510,393 A | * | 6/1950 | Fraser et al. ............ | 251/256 |
| 3,395,888 A | * | 8/1968 | Neto ...................... | 251/256 |
| 3,743,245 A | * | 7/1973 | Demler, Sr. ............. | 251/257 |
| 4,343,456 A | * | 8/1982 | Zitzloff ................... | 251/255 |
| 5,103,857 A | * | 4/1992 | Kuhn et al. ............ | 137/315.13 |
| 5,941,272 A | | 8/1999 | Feldman ................. | 137/223 |
| 6,089,251 A | * | 7/2000 | Pestel ..................... | 137/234.5 |
| 7,063,102 B2 | * | 6/2006 | Lin ......................... | 137/223 |

* cited by examiner

*Primary Examiner*—John Rivell
*Assistant Examiner*—Atif H Chaudry
(74) *Attorney, Agent, or Firm*—Alan Kamrath; Kamrath & Associates PA

(57) ABSTRACT

A safety valve device is mounted on an inflatable apparatus and has a body, a manual seal assembly and a check valve. The body has an annular sidewall and an annular bracket mounted on the sidewall and having a central opening. The manual seal assembly is connected to the body and has a knob, a seal and a spring. The knob is mounted rotatably on the body and has multiple compression ridges. The seal is mounted slidably between the knob and the annular bracket, selectively closes the central opening and has multiple compression ridges corresponding to those on the knob. The spring biases the seal to open the central opening. The check valve has a diaphragm that selectively closes the central opening. The inflatable apparatus with the safety valve device has a good hermetic effect.

14 Claims, 6 Drawing Sheets

SAFETY VALVE DEVICE WITH A MANUAL SEAL ASSEMBLY FOR AN INFLATABLE APPARATUS

BACKGROUND OF THE INVENTION

1. Field of the Invention

The present invention relates to a valve device, and more particularly to a safety valve device for an inflatable apparatus, which has a check valve to keep air from leaking from the inflatable apparatus and a manual seal assembly to selectively seal the inflatable apparatus.

2. Description of Related Art

Inflatable apparatuses such as inflatable mattresses, sofas or swimming pools generally have a valve device. The valve device is connected to an air pump when the inflatable apparatus is inflated so the air pump can pump air through the valve into an internal air chamber.

A conventional valve device is mounted on the inflatable apparatus and has a body and a check valve. The body has an inner surface. The check valve has a valve stem and a diaphragm and is mounted movably in the body and hermetically contacts the inner surface to keep air from leaking from the inflatable apparatus.

However, the check valve cannot prevent ambient matter such as dust from passing through the valve device. The ambient matter accumulated between the diaphragm and the body causes leakage.

With reference to FIGS. 8 and 9, another valve device for the inflatable apparatus is disclosed in the U.S. Pat. No. 5,941, 272. The valve device has a hollow body, a framework (60), a valve stem (70) and a diaphragm (80).

The body has an inner surface.

The framework (60) is mounted in the body and has a recess having an inner surface and a positioning protrusion (61) extending inward from the inside surface.

The valve stem (70) is hollow, is mounted slidably and rotatably in the framework (60) and has an outer surface, a positioning protrusion (71), an abutment protrusion (72) and a spring. The positioning and abutment protrusions (71, 72) protrude out from the outer surface of the valve stem (70). The spring is mounted between inner surface of the recess of the framework and the valve stem (70) and biases the valve stem up.

The diaphragm (80) is mounted on the valve stem (70) and hermetically contacts the inner surface of body to prevent leakage when the positioning and abutment protrusions (71, 72) are located above the positioning protrusion (61) on the framework (60). The diaphragm (80) is disengaged from the inner surface of the body to deflate an inflatable apparatus connected to the valve device when the positioning protrusion (61) on the framework (60) is located above the positioning protrusion (71) on the valve stem (70) and abuts the abutment positioning protrusion (72).

However, the aforementioned valve device can not prevent ambient matter from accumulating between the diaphragm and the body. Leakage still happens due to the accumulated matter.

To overcome the shortcomings, the present invention provides a safety valve device with a manual seal assembly for an inflatable apparatus to mitigate or obviate the aforementioned problems.

SUMMARY OF THE INVENTION

The main objective of the invention is to provide a safety valve device for an inflatable apparatus that has a check valve to keep air from leaking from the inflatable apparatus and a manual seal assembly to selectively seal the inflatable apparatus and keep ambient matter from passing through the valve device.

A safety valve device in accordance with the present invention is mounted on an inflatable apparatus and comprises a body, a manual seal assembly and a check valve.

The body has an annular sidewall and an annular bracket mounted on the sidewall and having a central opening.

The manual seal assembly is connected to the body and has a knob, a seal and a spring. The knob is mounted rotatably on the body and has multiple compression ridges. The seal is mounted slidably between the knob and the annular bracket, selectively closes the central opening and has multiple compression ridges corresponding to those on the knob. The spring biases the seal to open the central opening.

The check valve has a diaphragm selectively closing the central opening.

Other objectives, advantages and novel features of the invention will become more apparent from the following detailed description when taken in conjunction with the accompanying drawings.

DETAILED DESCRIPTION OF PREFERRED EMBODIMENT

A safety valve device in accordance with the present invention is mounted on an inflatable apparatus such as an inflatable mattress or sofa. The safety valve device may connect to an air pump so the inflatable apparatus can be deflated or inflated by the air pump through the safety valve device.

With reference to FIGS. 1, 2, 5 and 7, the safety valve device comprises a body (10, 10a), a manual seal assembly (30, 30a) and a check valve (20).

Figure 4:
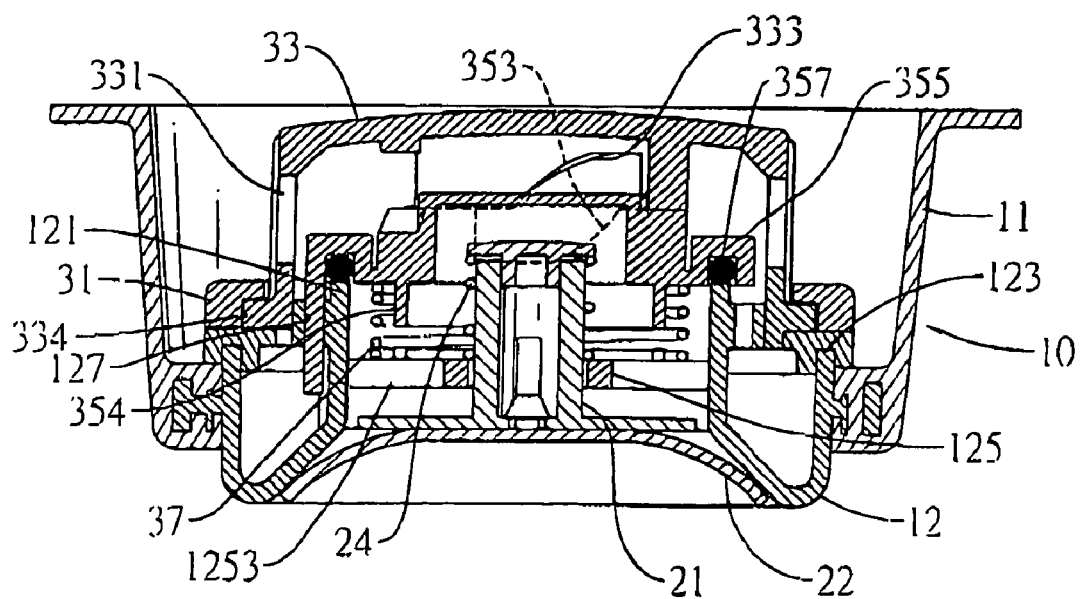
FIG. 4 is an operational cross-sectional side view of the safety valve device in FIG. 3 with the seal closing the channels in the body.
Figure 5:
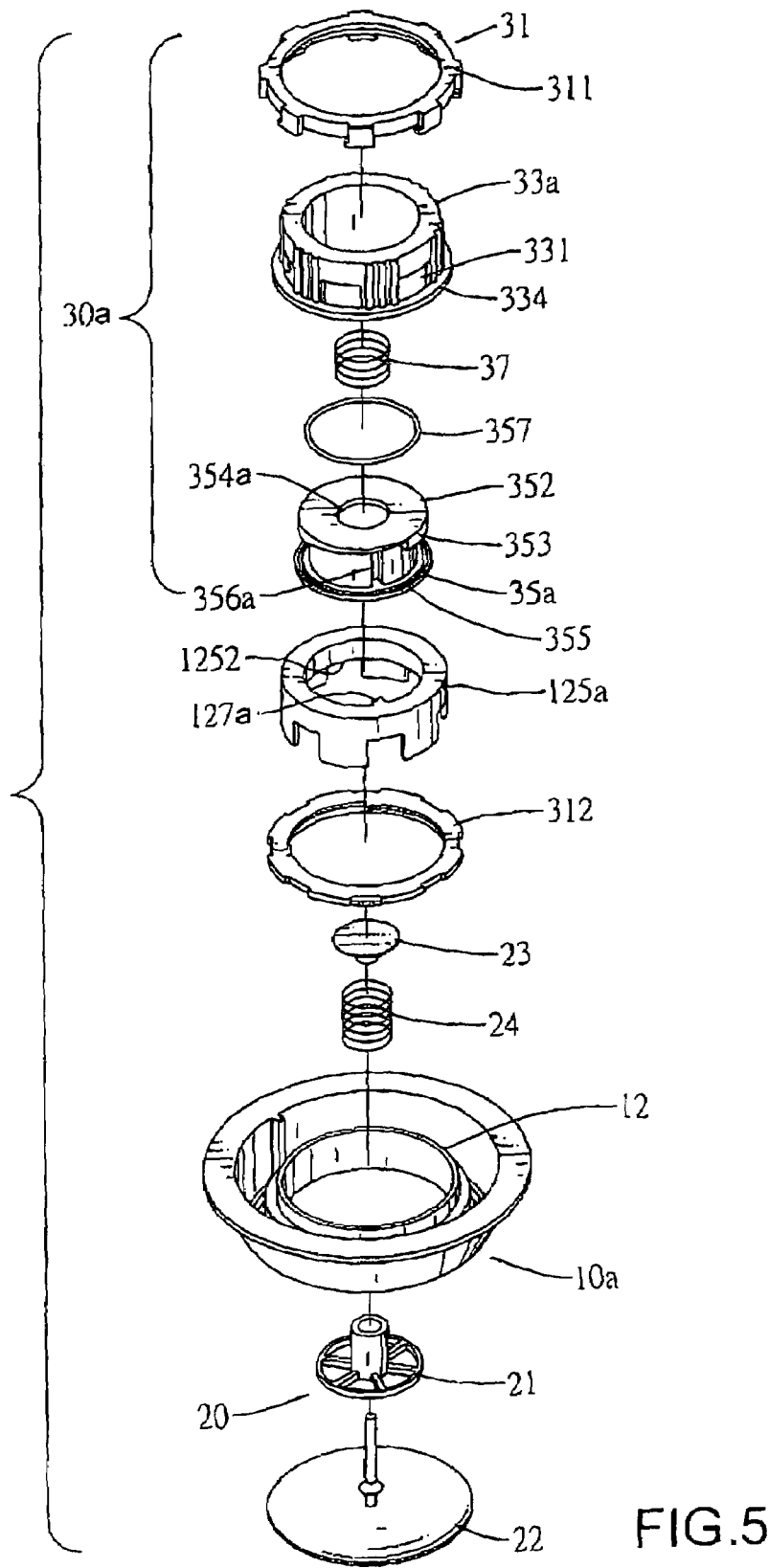
FIG. 5 is an exploded perspective view of a second embodiment of a safety valve device for an inflatable apparatus in accordance with the present invention.

The body (10, 10a) is mounted on the inflatable apparatus and has an annular sidewall (11) and an annular bracket (12). The annular sidewall (11) has an inside surface. With further reference to FIG. 4, the annular bracket (12) is mounted on the inside surface of the annular sidewall (11) and has a U-shaped cross-section, an inner annular flange (121), an outer annular flange (123), an inside surface, a central opening, a annular frame (125, 125a) and an alignment member (127, 127a). The central opening is defined through the annular bracket (12) inside the inner annular flange (121). The annular frame (125, 125a) is mounted in the inner annular flange (121) in the central opening. In a first embodiment of the safety valve device in accordance with the present invention, the annular frame (125) has a mounting hole (1251) and multiple channels (1253). The mounting hole (1251) and the channels (1253) are defined through the annular frame (125) and communicate with the central opening. In a second embodiment of the safety valve device in accordance with the present invention, the annular frame (125a) has an annular top edge and an annular valve seat (1252). The annular valve seat (1252) extends inward from the annular top edge of the annular frame (125a), bends and extends downward longitudinally. The alignment member (127, 127a) is defined on the annular bracket (12). In the first embodiment of the safety valve device, the alignment member (127) is a set of multiple slots defined through an annular shoulder (not numbered) extending out from the inner annular flange (121) of the annular bracket (12). In the second embodiment of the safety valve device, the alignment member (127a) is a protrusion extending inward from the annular frame (125a).

The manual seal assembly (30, 30a) is connected to the body (10, 10a) and has a mounting collar (31), a knob (33, 33a), a seal (35, 35a) and a spring (37).

The mounting collar (31) may be a combination of an upper collar (311) and a lower collar (312), is connected to the outer annular flange (123) of the annular bracket (12) and has a bottom edge and a radial lip. The radial lip is defined on and extends out from the bottom edge of the mounting collar (31).

The knob (33, 33a) is mounted rotatably in the mounting collar (31) and has an annular sidewall, a top, an open bottom, an annular brim (334), multiple inlets (331), an optional cylinder (332) and multiple inclined compression ridges (333). The top has an inner surface. The annular brim (334) extends radially out from the open bottom of the knob (33, 33a) and is held rotatably in the mounting collar (31) by the radial lip. The inlets (331) are defined through the sidewall and communicate with the central opening in the annular bracket (12) so air pumped by an air pump can pass through the inlets (331) and the central opening in the annular bracket (12). In the second embodiment of the safety valve device, the cylinder (332) extends down from the inner surface of the of the top and has an annular edge and an annular seat (3321) extending inward from the annular edge of the cylinder (332). The compression ridges (333) are formed on the knob (33, 33a) circularly at intervals, and each compression ridge (333) has an inclined surface and an outer flat surface. In the first embodiment of the safety valve device, the compression ridges (333) protrude down from the inner surface of the knob (33). In the second embodiment of the safety valve device, the compression ridges (333) protrude up from the annular seat (3321) on the cylinder (332).

The seal (35, 35a) is hollow, is mounted slidably between the knob (33, 33a) and the annular bracket (12) in the body (10) and selectively closes the central opening in the annular bracket (12) by rotating the knob (33, 33a). The seal (35, 35a) has a top, a bottom, an inner surface, an annular sealing lip (355), a spring mount (354, 354a), an optional annular overhang (352), multiple inclined compression ridges (353) and an alignment member (356, 356a).

In the second embodiment of the safety valve device, the seal (35a) has a central mounting hole (358) defined through the bottom of the seal (35a).

The annular sealing lip (355) extends out from the bottom of the seal (35, 35a), selectively engages hermetically the annular bracket (12) to seal the central opening in the annular bracket (12) and has an optional annular groove and an optional resilient O-ring (357). The annular groove is defined in the annular sealing lip (355). The O-ring (357) is mounted in the annular groove. In the first embodiment of the safety valve device, the O-ring (357) in the annular sealing lip (355) selectively engages hermetically the inner annular flange (121) of the annular bracket (12). In the second embodiment of the safety valve device, the O-ring (357) in the annular sealing lip (355) selectively engages hermetically the annular valve seat (1252) of the annular frame (125).

The spring mount (354, 354a) is defined on the seal (35, 35a). In the first embodiment of the safety valve device, the spring mount (354) is an annular protrusion protruding down from the bottom of the seal (35). In the second embodiment of the safety valve device, the spring mount (354a) is a recess defined in the top of the seal (35a).

In the second embodiment of the safety valve device, the annular overhang (352) extends outward from the top of the seal (35a).

Figure 1:
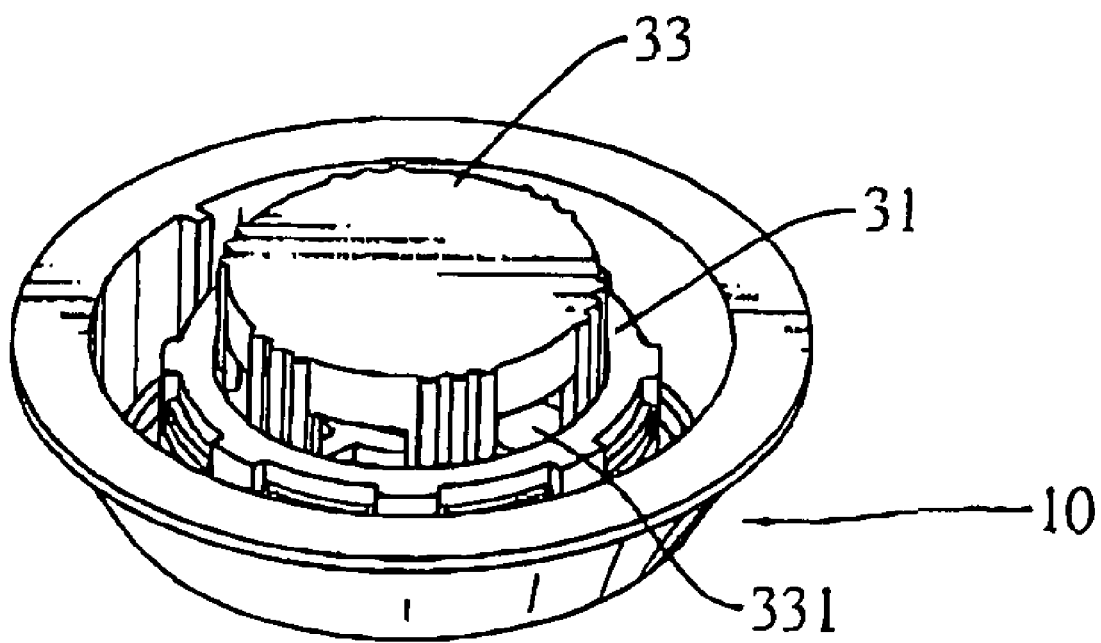
FIG. 1 is perspective view of a first embodiment of a safety valve device for an inflatable apparatus in accordance with the present invention.
Figure 2:
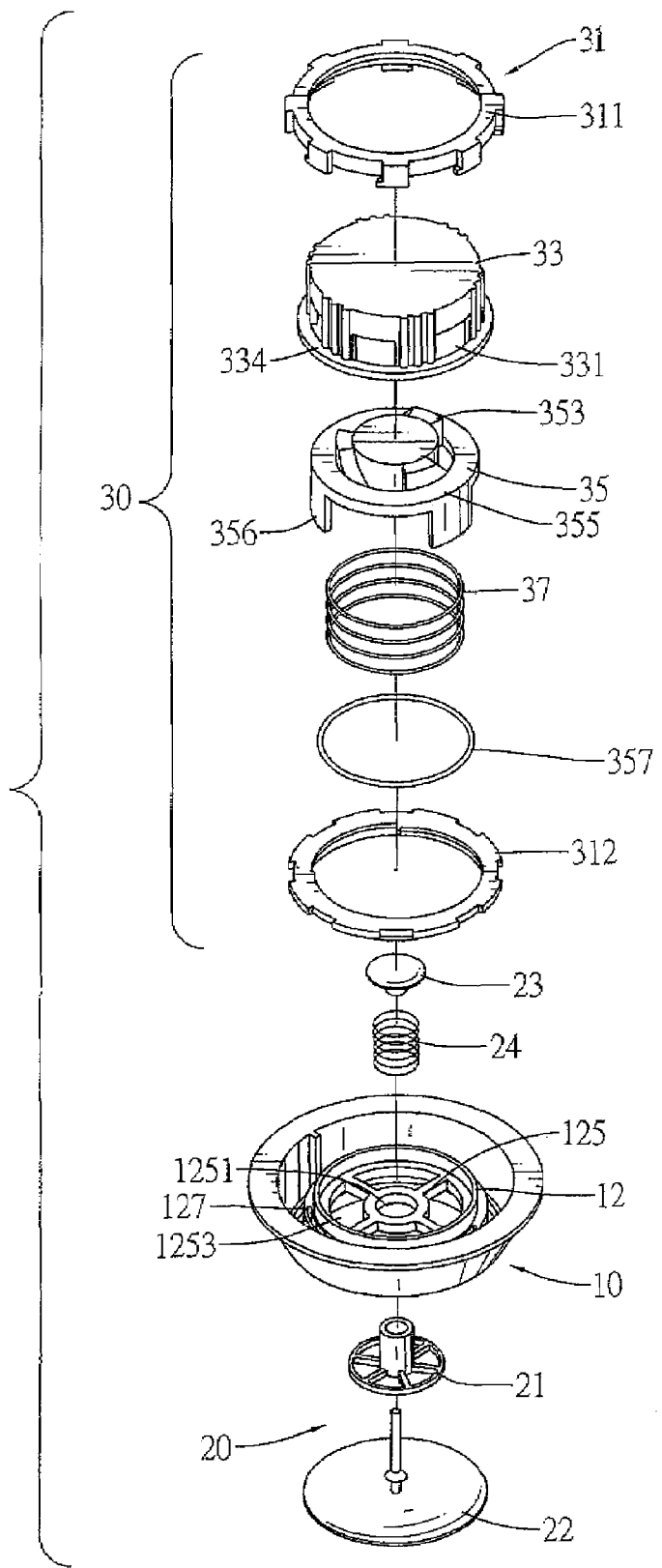
FIG. 2 is an exploded perspective view of the safety valve device in FIG. 1.
Figure 3:
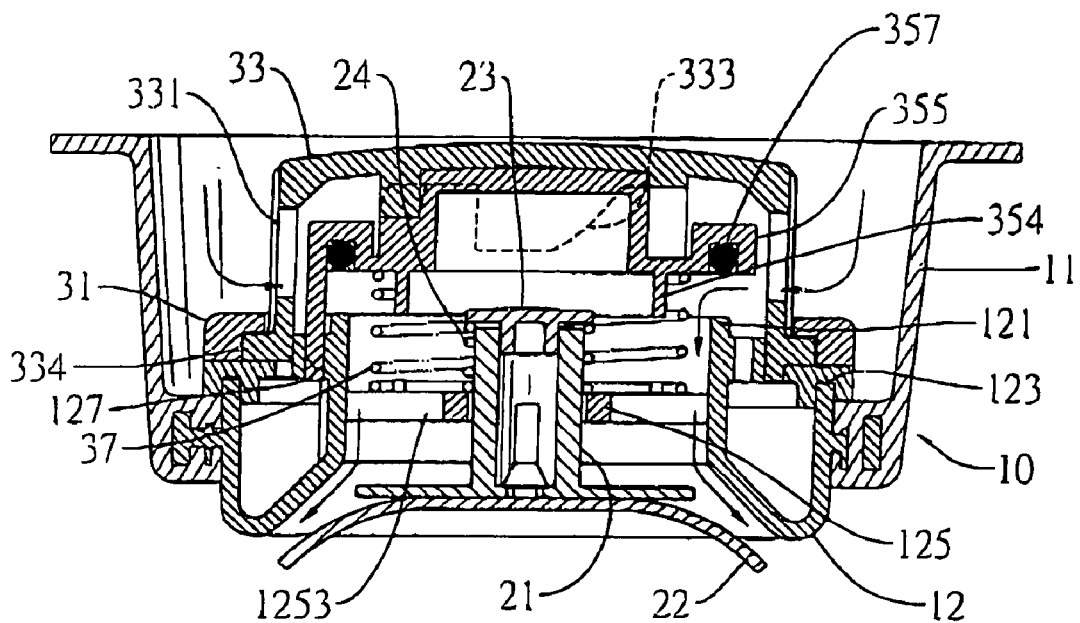
FIG. 3 is an operational cross-sectional side view of the safety valve device in FIG. 1 with air flowing into the safety valve device.
Figure 6:
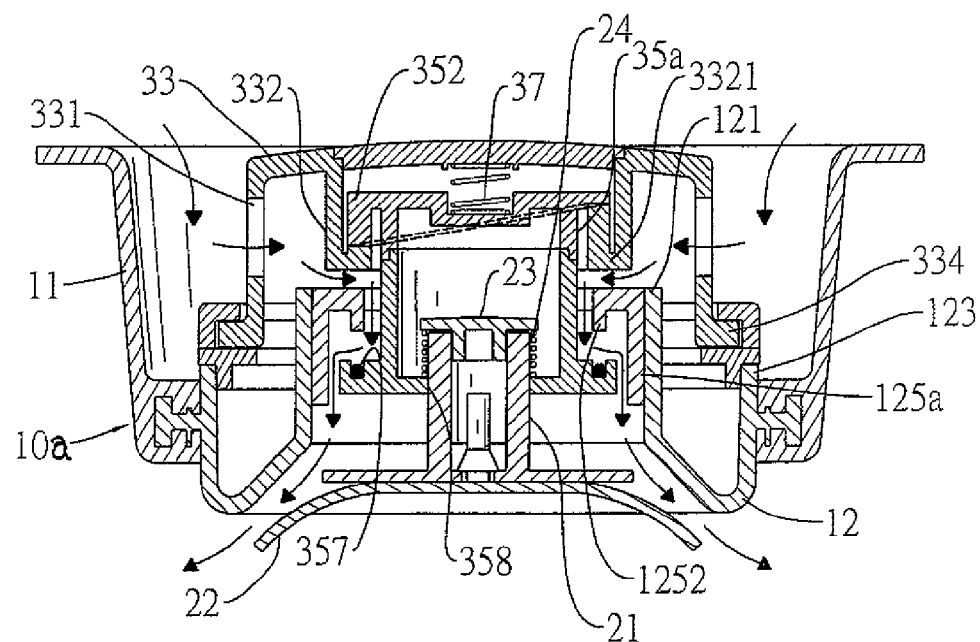
FIG. 6 is an operational cross-sectional side view of the safety valve in FIG. 5 with air flowing into the safety valve device.
Figure 7:
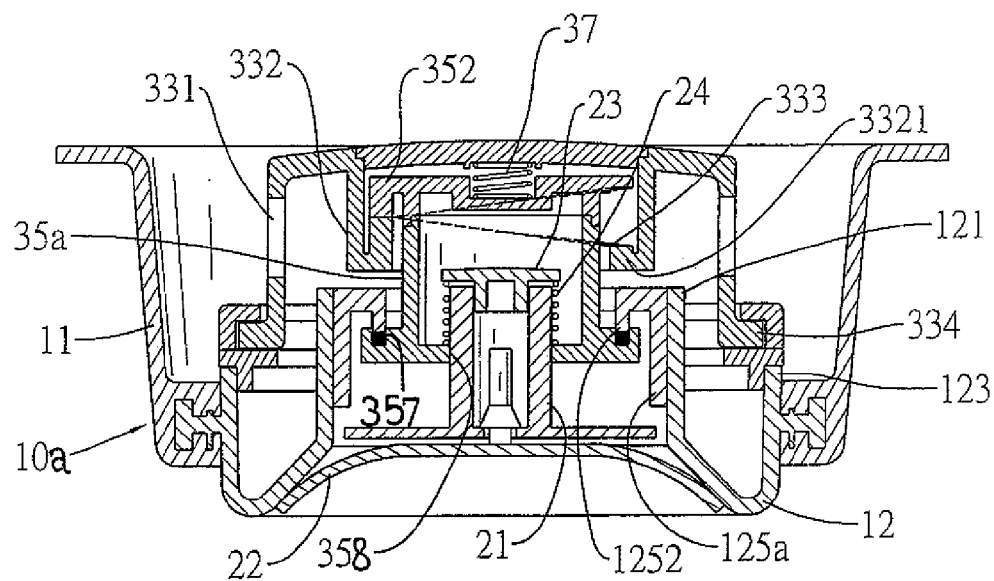
FIG. 7 is an operational cross-sectional side view of the safety valve device in FIG. 6 with the seal sealing the channels in the body.
Figure 8:
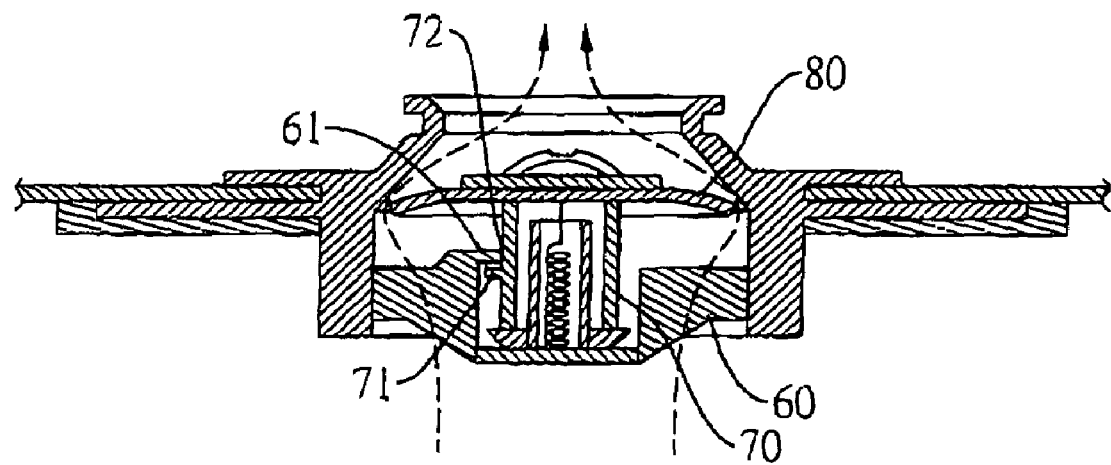
FIG. 8 is a cross-sectional side view of a conventional valve device in accordance with the prior art.
Figure 9:
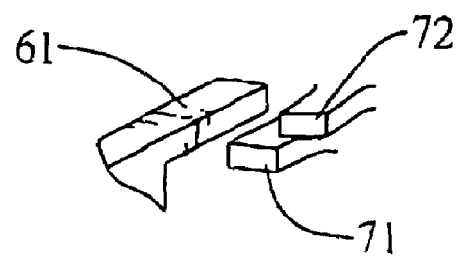
FIG. 9 is an enlarged perspective view of the valve device in FIG. 8.

The compression ridges (353) are formed circularly at intervals on the seal (35, 35a) and correspond to and engage the compression ridges (333) on the knob (33, 33a). Each compression ridge (353) has an inclined surface and an outer flat surface. The inclined surface of each compression ridge (333) on the knob (33, 33a) abuts the inclined surface of a corresponding compression ridge (353) on the seal (35, 35a) when the seal (35, 35a) opens the central opening in the annular bracket (12), as shown in FIGS. 3 and 6. Alternatively, the outer flat surfaces of the compression ridges (333, 353) on the knob (33, 33a) and the seal (35, 35a) abut each other when the seal (35, 35a) closes the central opening in the annular bracket (12), as shown in FIGS. 4 and 7. In the first embodiment of the safety valve device, the compression ridges (353) protrude up from the annular sealing lip (355) on the seal (35). In the second embodiment of the safety valve device, the compression ridges (353) protrude down from the annular overhang (352).

The alignment member (356, 356a) is defined on the seal (35, 35a) and engages the alignment member (127, 127a) on the annular bracket (12). In the first embodiment of the safety valve device, the alignment member (356) of the seal (35) is a set of multiple legs formed on the bottom of the seal (35) and mounted slidably through the slots in the annular shoulder on the annular bracket (12). In the second embodiment of the safety valve device, the alignment (356a) of the seal (35a) is a longitudinal groove defined in the seal (35a) and slidably engages the protrusion on the annular frame (125a) of the annular bracket (12).

The spring (37) is attached to the spring mount (354, 354a) on the seal (35, 35a), biases the seal (35, 35a) to open the central opening in the annular bracket (12) and is squeezed when the outer flat surfaces of the compression ridges (333, 353) on the knob (33, 33a) and the seal (35, 35a) abut each other. In the first embodiment of the safety valve device, the spring (37) is mounted around the spring mount (354) in the form of an annular protrusion on the seal (35) between the seal (35) and the annular frame (125). In the second embodiment of the safety valve device, the spring (37) is mount in the spring mount (354a) in the form of a recess between the seal (35a) and the knob (33a).

The check valve (20) is mounted slidably in the central opening in the annular bracket (12) and has a valve shaft (21), a diaphragm (22), an enlarged head (23) and a spring (24).

The valve shaft (21) is mounted slidably in the central opening in the annular bracket (12) has a top and a bottom. In the first embodiment of the safety valve device, the valve shaft (21) is mounted slidably through the mounting hole (1251) in the annular frame (125). In the second embodiment of the safety valve device, the valve shaft (21) is mounted slidably through the central mounting hole (358) in the bottom of the seal (35a).

The diaphragm (22) is made of resilient material, is connected to the bottom of the valve shaft (21) and hermetically contacts the inside surface of the annular bracket (12) of the body (10).

The enlarged head (23) is connected to the top of the valve shaft (21) and extends radially out from the valve shaft (21).

The spring (24) is mounted around the valve shaft (21) and biases the diaphragm (22) to hermetically contact the inner annular flange (121) of the annular bracket (12) so the central opening and the channels (1253) in the annular frame (125) are closed. In the first embodiment of the safety valve device, the spring (24) abuts the enlarged head (23) and the annular frame (125).

In the second embodiment of the safety valve device, the spring (24) abuts the enlarged head (23) and the inner surface of the seal (35a).

The diaphragm (22) hermetically contacting the inside surface of the annular bracket (12) prevents the inflatable apparatus from leaking air. The manual seal assembly (30, 30a) selectively seals the inflatable apparatus by rotating the knob (33, 33a) to move the seal (35, 35a) downward or upward and to make the O-ring (357) abutting against the inner annular flange (121) of the annular bracket (12) or the annular valve seat (1252) of the annular frame (125). With the seal of the seal assembly, ambient matter is prevented from passing into the inflatable apparatus, and the inflated apparatus is kept from leaking air. Therefore, the inflatable apparatus with the safety valve device has a fine hermetic effect.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A safety valve device for an inflatable apparatus comprising:
    a body having a central opening;
    a manual seal assembly connected to the body and having
        a knob rotatably mounted on the body and having
            an annular sidewall;
            multiple inclined compression ridges formed on the knob and each inclined compression ridge having an outer flat surface; and
            multiple inlets defined through the annular sidewall and communicating with the central opening; and
        a seal mounted slidably between the knob and the body and having
            an annular sealing lip extending out from the seal, so that the sealing lip selectively engages hermetically with the body to seal the central opening;
            a spring connected to the seal, biasing the seal to open the central opening in the body; and
            multiple inclined compression ridges formed on the seal, corresponding to and engaging the compression ridges on the knob and each inclined compression ridge having an outer flat surface, wherein rotation of the knob changes the engagement between the compression ridges of the knob and the seal and causes the seal to slide and selectively close the central opening;
    wherein when the outer flat surfaces of the inclined compression ridges on the knob and the seal abut each other, the seal closes the central opening to prevent fluid from flowing in sequence from ambient, through a peripheral edge of the seal, to the central opening of the body, and into the inflatable apparatus.

2. The safety valve device as claimed in claim 1, wherein:
    the body further has an annular sidewall having an inside surface and an annular bracket mounted on the inside surface of the annular sidewall;
    the central opening is defined through the annular bracket inside the inner annular flange;
    the manual seal assembly further has a mounting collar connected to the body;
    the knob is mounted rotatably in the mounting collar and further has a top having an inner surface and an open bottom;
    the compression ridges of the knob are formed circularly at intervals on the knob, and each compression ridge having an inclined surface;
    the seal is hollow, is mounted slidably between and knob and the annular bracket in the body, selectively closes the central opening in the annular bracket and has a top, a bottom, an inner surface and a spring mount defined on the seal;
    the annular sealing lip of the seal selectively engages hermetically with the annular bracket of the body;
    the compress ridges of the seal are formed circularly at intervals on the seal and each compression ridge has an inclined surface; and
    the spring of the manual seal assembly is attached to the spring mount and biases the seal to open the central opening in the annular bracket;
    a check valve is mounted slidably in the central opening in the annular bracket and has a valve shaft mounted slidably in the central opening in the annular bracket, connected to the diaphragm and having a top and a bottom, a diaphragm connected to the valve shaft and selectively closing the central opening, an enlarged head connected to the valve shaft and extending out radially from the valve shaft, and a spring mounted around the valve shaft and biasing the diaphragm to hermetically contact the annular bracket.

3. The safety valve device as claimed in claim 2, wherein:
    the annular bracket of the body has a U-shaped cross section, an inner annular flange and an outer annular flange; and
    the mounting collar is connected to the outer annular flange of the annular bracket of the body.

4. The safety valve device as claimed in claim 3, wherein:
    the annular frame has a mounting hole and multiple channels defined through the annular frame and communicating with the central opening;
    the compression ridges on the knob protrude down from the inner surface of the knob;
    the annular sealing lip on the seal selectively engages hermetically the inner annular flange of the annular bracket;
    the spring mount of the seal is an annular protrusion protruding down from the bottom of the seal;
    the compression ridges on the seal protrude up from the annular sealing lip;

the spring of the manual seal assembly is mounted around the annular protrusion on the seal between the seal and the annular frame;

the valve shaft of the check valve is mounted slidably though the mounting hole in the annular frame; and the spring of the check valve abuts the enlarged head and the annular frame.

5. The safety valve device as claimed in claim 4, wherein the annular sealing up on the seal further has an annular groove defined in the annular sealing lip; and a resilient O-ring mounted in the annular groove and selectively engaging hermetically the annular valve seat of the annular frame.

6. The safety valve device as claimed in claim 4, wherein:

the annular bracket further has an alignment member being multiple slots defined though an annular shoulder extending out from the annular bracket; and the seal further has an alignment member being multiple legs formed on the bottom of the seal and mounted slidably through the slots in the annular shoulder on the annular bracket.

7. The safety valve device as claimed in claim 3, wherein:

the seal has a mounting hole defined though the bottom of the seal;

the annular frame has an annular top edge and an annular valve seat extending inward from the annular top edge, bending and extending downward longitudinally;

the knob of the manual seal assembly further has a cylinder extending down from the inner surface of the top of the knob and having an annular edge and an annular seat extending inward from the annular edge of the cylinder;

the compression ridges of the knob protrude up from the annular seat on the cylinder;

the annular sealing tip on the seal selectively engages hermetically the annular valve seat of the annular frame of the annular bracket;

the spring mount of the seal is a recess defined in the top of the seal;

the seal further has an annular overhang extending outward from the top of the seal;

the compression ridges of the seal protrude down from the annular overhang;

the spring of the manual seal assembly is mounted in the recess in the seal between the seal and the knob;

the valve shaft of the check valve is mounted slidably through the central mounting hole in the bottom of the seal; and the spring of the check valve abuts the enlarged head and the inner surface of the seal.

8. The safety valve device as claimed in claim 7, wherein the annular sealing lip on the seal further has an annular groove defined in the annular sealing lip; and a resilient O-ring mounted in the annular groove and selectively engaging hermetically the annular valve seat of the annular frame.

9. The safety valve device as claimed in claim 7, wherein:

the annular bracket further has an alignment member being a protrusion extending inward from the annular frame; and the seal further has an alignment member being a longitudinal groove defined in the seal and slidably engaging the protrusion on the annular frame of the annular bracket.

10. The safety valve device as claimed in claim 3, wherein the annular sealing lip on the seal further has an annular groove defined in the annular sealing lip; and a resilient O-ring mounted in the annular groove and selectively engaging hermetically the annular valve seat of the annular frame.

11. The safety valve device as claimed in claim 2, wherein the annular sealing lip on the seal further has an annular groove defined in the annular sealing lip; and a resilient O-ring mounted in the annular groove and selectively engaging hermetically the inner annular flange of the annular bracket.

12. The safety valve device as claimed in claim 2, wherein:

the annular bracket further has an alignment member defined on the annular bracket; and the seal further has an alignment member defined on the seal and engages the alignment member on the annular bracket.

13. The safety valve device as claimed in claim 1, wherein the body further has an annular sidewall having an inside surface and an annular bracket mounted on the inside surface of the annular sidewall;

the central opening is defined though the annular bracket inside the inner annular flange;

the manual seal assembly further has a mounting collar connected to the body;

the knob is mounted rotatably in the mounting collar and further has a top having an inner surface and an open bottom;

the compression ridges of the knob are formed circularly at intervals on the knob, and each compression ridge having an inclined surface;

the seal is hollow, is mounted slidably between and knob and the annular bracket in the body, selectively closes the central opening in the annular bracket and has a top, a bottom, an inner surface and a spring mount defined on the seal;

the annular sealing lip of the seal selectively engages hermetically with the annular bracket of the body;

the compress ridges of the seal are formed circularly at intervals on the seal. and each compression ridge has an inclined surface; and the spring of the manual seal assembly is attached to the spring mount and biases the scat to open the central opening in the annular bracket.

14. The safety valve device as claimed in claim 1, wherein the body further has an inside surface and the central opening is defined in the inside surface of the body;

a check valve is mounted slidably in the central opening in the body and has a valve shaft mounted slidably in the central opening in the body, connected to the diaphragm and having a top and a bottom, a diaphragm connected to the valve shaft and selectively closing the central opening, an enlarged head connected to the valve shaft and extending out radially from the valve shaft, and a spring mounted around the valve shaft and biasing the diaphragm to hermetically seal the central opening.

* * * * *